Dec. 8, 1959    L. FLOAM ET AL    2,916,567
CONTROL SWITCH FOR VEHICLE SIGNALLING SYSTEM
Filed Aug. 15, 1955    2 Sheets-Sheet 1
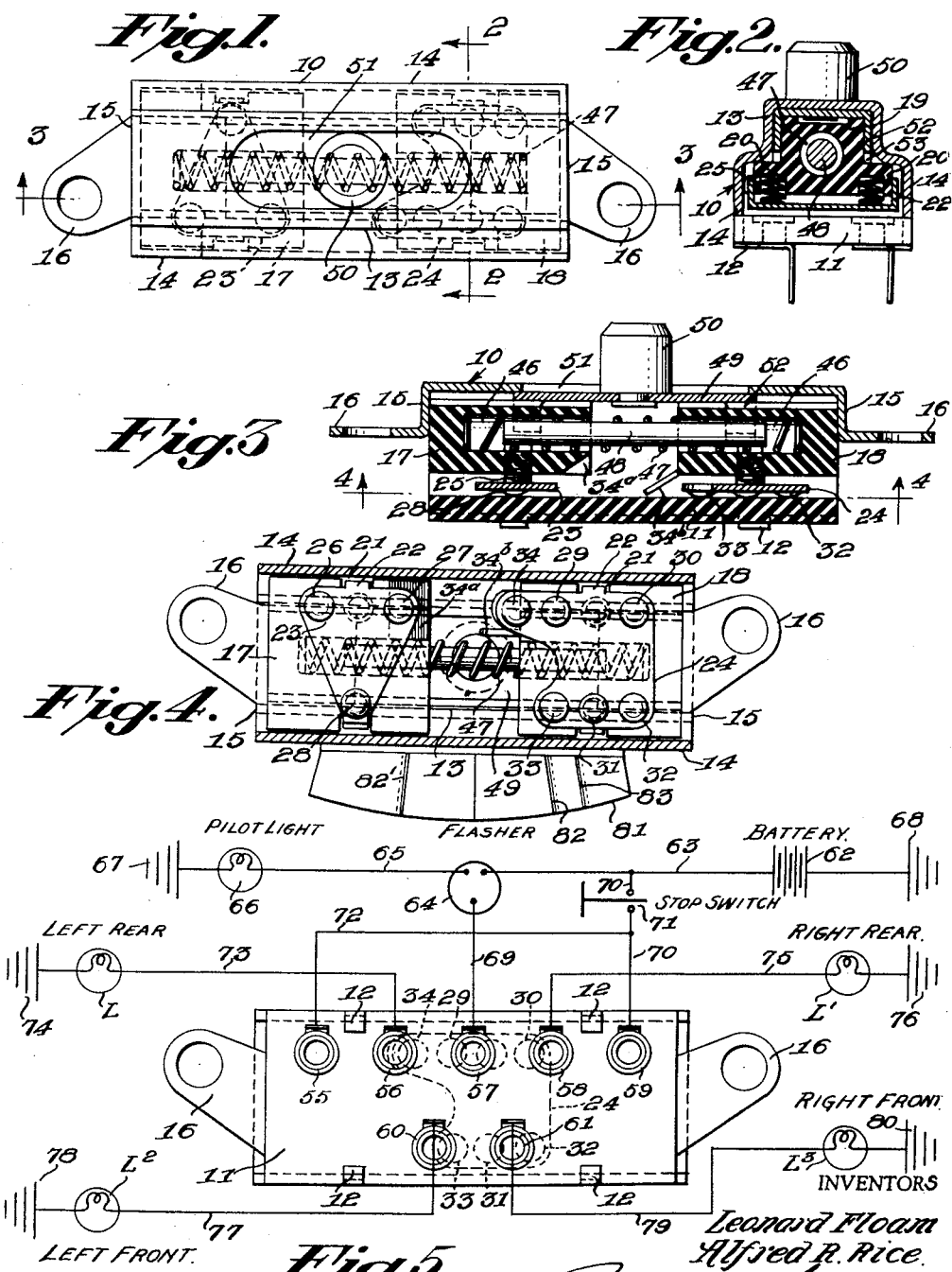
INVENTORS
Leonard Floam
Alfred R. Rice
BY
ATTORNEY

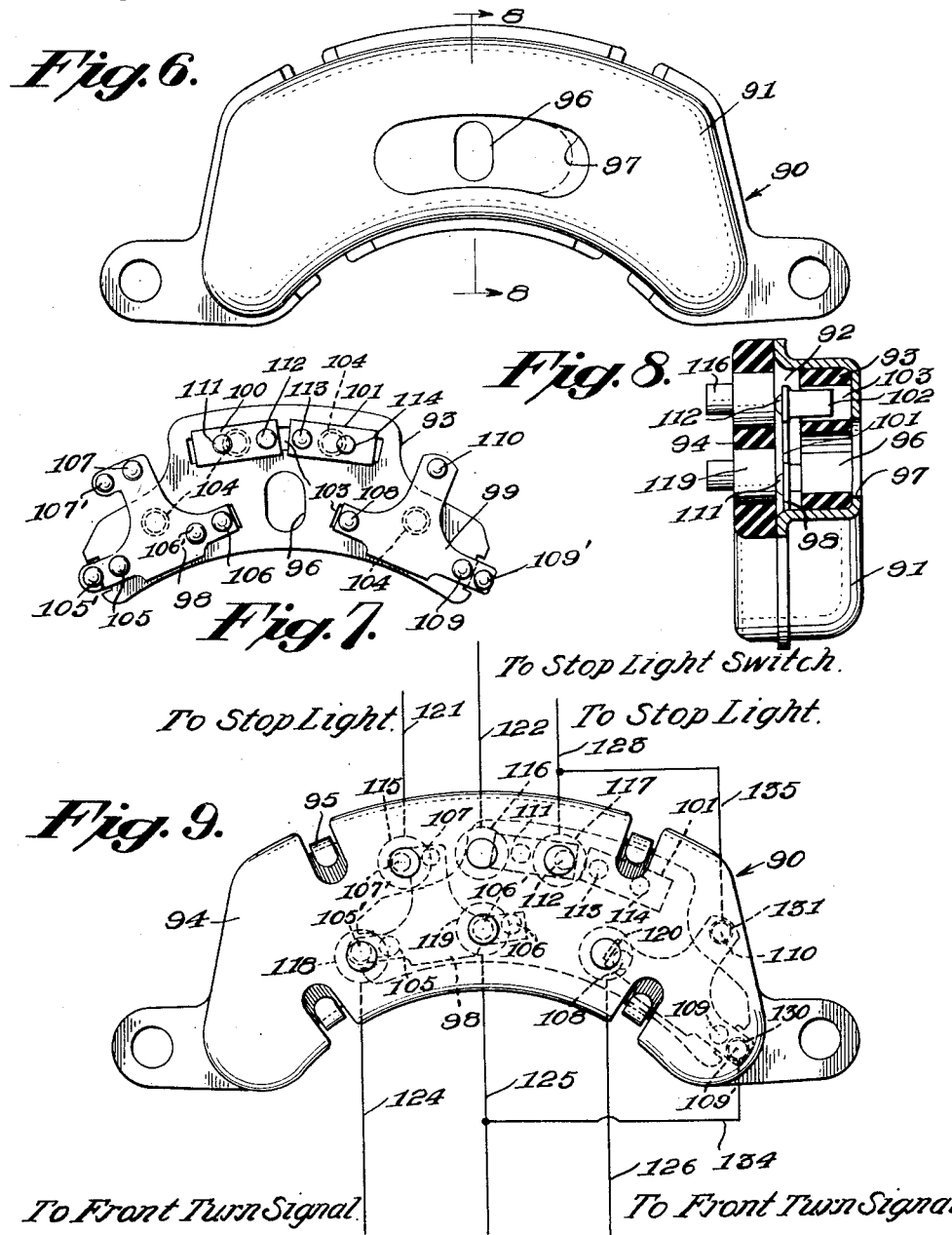

United States Patent Office 2,916,567
Patented Dec. 8, 1959

2,916,567

CONTROL SWITCH FOR VEHICLE SIGNALLING SYSTEM

Leonard Floam, Washington, D.C., and Alfred R. Rice, Silver Spring, Md.

Application August 15, 1955, Serial No. 528,198

9 Claims. (Cl. 200—16)

The present invention relates to improvements in switches, and more particularly to switches for use in directional signalling systems for automotive vehicles.

As is generally known, it is now the general practice to provide automotive vehicles with visible left and right turn signals which generally embody left and right lamps at both the front and rear of the vehicle. The front and rear left lamps and the front and rear right lamps are selectively put into circuit by a control switch with the vehicle battery and a flasher which provides a visible warning for both approaching and trailing vehicles of the intent of a right or left turn about to be made by the driver of the signalling vehicle. In addition, automotive vehicles are provided with a rear stop signal which usually includes left and right lamps which are in circuit with a stop light switch actuated by the operation of the vehicle brake pedal and the vehicle battery. These stop lights do not remain on when the vehicle is stopped and the brake pedal released.

In many cases the left and right rear lamps function as both the turn signals and the stop signals, and in these cases the control switch is in circuit with both the flasher unit and the stop light switch so that at the rear of the vehicle, one lamp will intermittently flash to indicate a turn and the other can remain constantly energized to indicate a deacceleration or stopping of the vehicle. While various forms of control switches for such stop and/or direction signalling systems have heretofore been provided or proposed, they are restricted to the selective energization of lamps on one or the opposite side of the vehicle since they have been constructed exclusively for such purpose.

Having in mind the defects of the prior art systems, it is the principal object of the present invention to provide a directional signal system for vehicles that may also be employed as a signal to indicate an emergency condition.

It is another object of the invention to provide a directional signal system for vehicles that is adapted to flash all four lamps in the system to indicate an emergency condition.

It is a further object of the present invention to provide an improvement in existing directional signal control switches whereby in addition to their capacity for selectively energizing the circuit for one or the other side, they are also capable of energizing both circuits simultaneously whereby all four vehicle lamps will flash simultaneously. Such condition will advise the driver of both approaching and trailing vehicles that something unusual has happened and possibly an emergency which calls for their stopping and rendering aid to the driver or occupants of the vehicle displaying the dual direction signal.

It is a further object of the invention to provide a switch for the above noted purpose which is manually operative in common with existing direction signalling switches and wherein the circuits to all four lamps are completed upon movement of the switch contact block toward the right or left a distance greater than that required for energizing the right or left lamps and wherein provision is made to avoid inadvertent movement of the block to a position for energizing all of the lamps.

It is a still further object of the invention to provide a control switch for the aforementioned purpose and having simplicity of design, economy of construction and efficiency in operation.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts through the several figures and in which:

Figure 1 is a top plan view of a switch incorporating the present invention;

Figure 2 is a transverse cross-sectional view corresponding to the plane of line 2—2 of Figure 1;

Figure 3 is a longitudinal cross-sectional view corresponding to the plane of line 3—3 of Figure 1;

Figure 4 is a cross-sectional view corresponding to the plane 4—4 of Figure 3;

Figure 5 is a bottom plan view of the switch and illustrating the connection thereof in a directional signal circuit;

Figure 6 is a top plan view of a modified form of switch;

Figure 7 is a plan view of the movable block and the contact plates supported thereby for the switch shown in Fig. 6;

Figure 8 is a transverse cross-sectional view corresponding to the plane of line 8—8 of Fig. 6; and Figure 9 is a bottom plan view of the switch shown in Figures 6-8 and illustrating the connection thereof in a directional signal circuit.

Referring now in detail to the drawings, specifically to Figs. 1 to 5 inclusive, the switch shown is of the general character disclosed in Patent No. 2,528,035, October 31, 1950, and these figures correspond to Figs. 3, 5, 6, 8 and 9 respectively of said patent. This switch comprises a metal housing 10 on the bottom of which an insulating plate 11 is removably secured by a plurality of bent over ears 12 which are integral with the housing 10. The housing 10 includes a substantially channel shaped section 13 from the side edges of which lengthwise extending side walls 14 depend. The opposite ends of section 13 are closed by end walls 15—15 from which mounting lugs 16—16 extend longitudinally outwardly.

A pair of contact carrying blocks 17 and 18 of insulating material are mounted for sliding movement lengthwise within the housing 10 and are each provided with a reduced upper end portion 19 fitting within section 13 (Fig. 2) together with laterally extending flange portions 20 the upper surfaces of which have sliding engagement with the lengthwise extending shoulders at the junctions of the walls 14 with the channel section 13. The opposite sides of the blocks 17 and 18 are provided with opposed grooves 21 (Fig. 4) into which ears 22 of a pair of metal contact plates 23 and 24 extend.

A pair of small coil springs 25 are disposed between each of the blocks 17 and 18 and said contact plates 23 and 24 respectively, for yieldingly urging the contact plates into engagement with the upper surface of the plate 11. The contact plate 23 is substantially triangular in plan and is provided with three contacts 26, 27 and 28, as also shown in said aforementioned patent. The contact plate 24, however, is a modification of the contact plate 37 in said patent and is provided with contacts 29, 30, 31, 32, 33 and 34, the contacts 29, 30 and 31 corresponding to the contacts 43, 44 and 45 in said patent.

The blocks 17 and 18 are each provided with a cylindrical recess 46 extending inwardly of the opposed inner ends thereof, and which recesses receive the opposite ends of a coil spring 47. A guide pin 48 is disposed internally of the spring 47 for preventing buckling thereof. The coil spring normally holds the blocks 17 and 18 in the position shown in Figs. 1, 3 and 4. An operating member 49 is mounted for rectilinear movement in the channel section 13 and is provided with a knob 50 which extends through a lengthwise slot 51 in the upper wall of the housing 10. The opposite side edges of the member 49 are provided with a pair of depending ears 52 which are adapted to contact shoulders 53 (Fig. 2) formed on the blocks 17 and 18, the ears 52 and shoulders 53 providing a one-way motion of the blocks as set forth in said patent whereby the contact plates 23 and 24 are individually moved.

The insulating plate 11, as shown in Fig. 5, is provided with a plurality of contacts 55, 56, 57, 58, 59, 60 and 61 for selective engagement by the contacts carried by the plates 23 and 24. The contacts 55–61 are suitably secured in the plate 11 and, preferably, are of the rivet form as disclosed in said patent.

The directional signal circuit, as shown in Fig. 5, comprises a battery 62 from which a lead 63 extends to a flasher mechanism or unit 64. A second terminal of the flasher unit 64 has a connection by means of a lead 65 with one terminal of a pilot light 66 while the other terminal of the light is grounded as at 67. The battery has its other terminal connected to ground as at 68. A lead 69 extends from the third terminal of the flasher 64 to the contact 57. A lead 70 has connection with the lead 63 anterior of the flasher 64 and a known conventional form of stop switch 71 is interposed in the lead 70 with such lead having connection at its other end with the contact 59 of the plate 11. A lead 72 is connected to lead 70 posterior of the switch 71 and extends to the contact 55.

The left rear lamp L is connected by lead 73 to contact 56 and the lamp is grounded as at 74. The right rear lamp L' is connected by lead 75 to contact 58 and the lamp is grounded as at 76. The left front lamp L2 is connected by lead 77 to contact 60 and the lamp is grounded as at 78. The right front lamp L3 is connected by lead 79 to contact 61 and the lamp is grounded as at 80.

In operation of the structure above described, and with the blocks 17 and 18 in their normal positions as indicated in Figs. 1, 3 and 4, movement of knob 50 to the right will cause movement of block 17 in the same direction and the contact plate 23 will be moved to a position wherein the contacts 26, 27 and 28 engage the contacts 56, 57 and 60 with a resulting flashing of the front and rear left lamps L2, L, and when the knob 50 is moved to the left the usual distance the contacts 29, 30 and 31 on plate 24 will engage the plate contacts 57, 58 and 61 with a resulting flashing of the front and rear right lamps L3, L'. It is, of course, to be understood that the knob 50 is, in practice, actuated by a lever (not shown) wherein movement of the finger engageable end of the lever will correspond to the direction of turn or in opposition to the movement of the knob.

Preferably, a retaining cam plate 81 (Fig. 4) is provided for retaining the lever in signalling position and which plate is provided with shoulders 82, 82' for retaining the lever in its right and left positions respectively. According to the present invention, this cam plate 81 is provided with an additional shoulder 83 for retaining the lever in its position wherein all of the lamps flash simultaneously for indicating an emergency, and which will now be described.

The contacts 32, 33 and 34 on plate 24 are additional to those disclosed in said patent and which correspond to the present contacts 29, 30 and 31. The present plate 24 with its contacts 29, 30 and 31 will function to cause the front and rear right lamps to function as in said patent upon engagement of said contacts with the contacts 57, 58 and 61 on plate 11 and in which position the knob actuating lever will engage shoulder 82. Upon further movement of the block 24 to the left, with the lever engaged with shoulder 83, the contacts 56, 57, 58, 60 and 61 on plate 11 will all be engaged by the contacts on plate 24 as indicated in Fig. 5, whereby a circuit will be completed through all of the lamps and the flasher whereupon all of the lamps L, L', L2 and L3 will flash simultaneously.

At this point it is to be observed that the block 17 is provided with a chamfer 34a and the block 18 is provided with an insulated projection 34b in juxtaposition to the chamfer 34a. Upon movement of the block 18 to its extreme position wherein the contact plate 24 bridges all contacts 56–61, it is necessary to remove the contact plate 23 from the path of the contact 34 to permit engagement of the latter with contact 56. This is effected by the projection 34b which passes into the chamfer 34a and engages the contact plate 23, biasing it away from the plate 11 and out of the path of contact 34 and plate 24.

Referring now to Figs. 6 through 9, the switch 90 is for the same general purpose as that shown in Figs. 1 to 5 inclusive and so far as the alternate energizing of opposite side signals is concerned, is well known. This modified form of switch differs essentially from the first form in that it includes a single movable contact plate supporting block 93 instead of a pair thereof as in the switch shown in Figs. 1–5. The switch 90, generally, comprises a metallic block supporting and guiding cover member 91 which, as shown in Fig. 8, provides an arcuate channel 92 in which a contact plate supporting block 93, of insulating material, is disposed for movement toward and from opposite ends of the channel.

The block 93 is confined within the channel 92 by means of a contact carrying plate 94 which is of insulating material and which is removably connected to the member 91 by means of bendable ears 95 on the member and which engage the plate 94, as shown in Fig. 9. The block 93 is provided centrally thereof with a lateral aperture 96 for receiving a knob or lever which is extendable through an elongated arcuate slot 97, through the cover 91, for moving the block 93 within the channel 92.

The block 93 removably supports four contact plates 98, 99, 100 and 101 and which plates are provided with laterally directed ears 102 (Fig. 8) which are loosely disposed within openings 103 in the block 93 and the plates are each supported by a coil spring 104 seated in a recess in the block. The plates 98 and 99 are normally provided with three contacts each, the plate 98 having contacts 105, 106 and 107 and the plate 99 having contacts 108, 109 and 110. The plate 100 is provided with two contacts 111 and 112 and the plate 101 is provided with two contacts 113 and 114. The insulated plate 94 is provided on its inner face with contacts 115, 116, 117, 118, 119 and 120. The above described contacts carried by the block 93 and supported by the plate 94 are embodied in existing switches.

As shown in Fig. 9, contact 115 is connected to a stop light by means of a lead 121, contact 116 is connected to a stop light switch by means of a lead 122, contact 117 is connected to an opposing stop light by means of a lead 123, contact 118 is connected to a front turn signal lamp by means of a lead 124, contact 119 is connected to a flasher unit by means of a lead 125 and contact 120 is connected to an opposing front turn signal lamp by means of a lead 126.

The block 93 is normally disposed centrally of the channel 92 with the plate contacts all yieldably urged against the inner face of insulated plate 94 but the only block supported contacts which are engaged with the insulating plate contacts in this normal position are those designated 111, 112, 113 and 114 of plates 100 and 101 and which engage the insulating plate contacts 115, 116 and 117 whereby the two stop lights are in circuit with the stop light switch.

In operation of the switch, upon movement of the block 93 to the left, as observed in Fig. 9, the contacts 108, 109 and 110 will be respectively engaged with contacts 119, 120 and 117 and the contacts 115 and 116 will be bridged by the contacts 113 and 114 of contact plate 101 whereby the stop light and front turn signal lamp as observed to the right in Fig. 9 will be in circuit with the flasher unit with a resulting flashing of the said stop light and front turn signal lamp, while the stop light on the other side is in circuit with the stop light switch.

Upon movement of the block 93 to the right, in Fig. 9, the contacts 105, 106 and 107 on contact plate 98 will be respectively engaged with contacts 118, 119 and 115 and contact plate 100 will bridge the contacts 116 and 117 with a resulting flashing of the stop light and front turn signal lamp as observed to left of Fig. 9. It is to be observed that the contact plates 100 and 101 maintain circuit connection between the stop light switch and the stop light in the normal position of the block and between the switch and a corresponding stop light in each left and right movement of the block, whereby the stop lights not only function as rear turn signals but also act as stop warnings upon operation of the brakes.

The present invention is an improvement upon the above described known switch structure whereby upon movement of the block 93 to a greater angular range in one direction, as shown in dotted lines in Fig. 9, both stop lights and both front turn signals are simultaneously flashed for indicating an emergency in relation to a vehicle equipped therewith. The improvement includes providing the contact plate 98 with three additional contacts 105', 106' and 107' disposed laterally of the contacts 105, 106 and 107 respectively, providing the contact plate 99 with one additional contact 109' disposed laterally of the contact 109 and in providing the insulated contact plate 94 with two additional contacts 130 and 131. The contact 130 is connected to the flasher unit lead 125 by a lead 134 and the contact 131 is connected to the stop light lead 123 by a lead 135. The slot 97 of the cover 91 is extended at one end, as indicated by phantom lines, to enable additional movement of the block 94 in one direction.

With the block 93 in the position indicated by dotted lines in Fig. 9, the insulated plate contacts 115, 118 and 119 are bridged by contacts 107', 105' and 106' respectively of the contact plate 98, while the insulated contact plate contacts 120, 130 and 131 are bridged by contacts 108, 109' and 110 of contact plate 99, and the contact plates 100 and 101 do not bridge any of the contacts of the insulated plate 94. Thus, it will be seen that the stop lights, the two front turn signal lamps and the flasher unit are all in circuit with a resulting flashing of both stop lights and the two front turn signal lamps for indicating an emergency in the same general way as above described in connection with the embodiment of the invention in Figs. 1 to 5, while the stop light switch is out of circuit and therefor inoperative.

Although only certain specific embodiments of the invention has been shown and described, it is obvious that many modifications thereof are possible. The invention, therefore, is not to be restricted except insofar as is necessitated by the prior art and by the spirit of the appended claims.

We claim:

1. A vehicle signalling switch comprising an elongated casing including a channel member and an insulated plate removably secured to said member in closing relation to the channel therein, said insulated plate being provided with a plurality of inwardly exposed contacts, means disposed within said channel for movement lengthwise of said casing and being provided with contact plates for bridging certain of the said contacts upon movement of said means toward one end of the casing and for bridging other of said contacts upon movement of said means toward the opposite end of said casing, and additional contact means on certain of said plates for simultaneously bridging all the contacts upon further movement of said means toward one end of the casing through a predetermined range for the purpose set forth.

2. A vehicle direction signalling switch comprising a casing including a channel member and an insulated plate removably secured to said member in closing relation to the channel therein, said insulated plate being provided with a plurality of inwardly exposed contacts, a pair of insulated blocks slidably disposed within said channel for selective movement toward and from the opposite ends of the casing, a metallic plate yieldably supported by each block and each plate being provided with contacts for engaging certain of the insulated plate contacts upon movement of the block through a predetermined range in said channel, and one of said plates being provided with additional contacts whereby all of said insulated plate contacts are simultaneously bridged upon further movement of the block supporting said one of said plates through a further predetermined range in said casing.

3. The structure according to claim 2, wherein one of said blocks is provided with a cam extension for raising the other plate upon movement of said one of said plates through said further predetermined range.

4. A vehicle direction signal switch comprising an insulated support carrying a plurality of fixed contacts arranged in two spaced groups and contact means common to both groups, and a pair of bridging contact means respectively cooperative with and movable relative to said contact groups, said bridging contact means each having a rest position out of engagement with said common contact means, and a normal operative position bridging the common contact means and the contacts of the respective group, and one of said bridging contact means having an emergency operative position bridging said common contact means and the contacts of both groups.

5. A vehicle direction signal switch comprising an insulated support carrying a plurality of fixed contacts arranged in two spaced groups each including two contacts, special contact means and contact means common to both groups, and a pair of bridging contact means respectively cooperative with and movable relative to said contact groups, said bridging contact means each having a rest position bridging a contact and the special contact means of its respective group, and a normal operative position bridging the common contact means and the two contacts of one group and a contact and special contact means of the other group, and one of said bridging contact means having an emergency operative position bridging said common contact means and the two contacts of both groups.

6. A vehicle direction signal switch comprising an insulated support carrying a plurality of fixed contacts arranged in two spaced groups each including two contacts, a special contact, and a contact common to both groups, and a pair of bridging contacts respectively cooperative with and movable relative to said contact groups, said bridging contacts having rest positions bridging a contact and the special contact of their respective group, and normal operative positions bridging the common contact and the two contacts of one group and the special contact and a contact of the other group, and one of said bridging contact means having an emergency operative position bridging said common contact and the two contacts of both groups.

7. A vehicle direction signal switch comprising an insulated support carrying a plurality of fixed contacts arranged in two spaced groups each including two contacts, a contact common to both groups, and contact means common to both groups, and a pair of bridging contact means respectively cooperative with and movable relative to said contact groups, said bridging contact means having rest positions bridging the common contact and a contact of their respective group, and normal operative positions wherein one of said bridging contact means bridges the common contact means and the two contacts of one group and the other of said bridging contact means bridges the common contact and a contact of the other group, and one of said bridging contact means having an emergency operative position bridging said common contact means and the two contacts of both groups.

8. A vehicle direction signalling switch comprising a casing including a channel member and an insulated plate removably secured to said member in closing relation to the channel therein, said insulated plate being provided with a first set of contacts for connection respectively with a flasher unit and front and rear lamps on each side of a vehicle, an insulated block slidably disposed within said channel for selective movement toward and from opposite ends of said casing, a pair of metal plates yieldably supported by said block and being provided with a second set of contacts for selectively bridging certain of the first set of contacts upon movement of said block, said insulated plate being provided with a pair of third contacts, one of which is for connection with one of said first set of contacts, and another of which is for connection with another of said first set of contacts, and one of said metal plates being provided with a fourth contact for engaging said one of said third pair of contacts upon further predetermined movement of said block wherein one of the contacts of said one of said metal plates contacts the other additional insulated plate contact for the purpose set forth.

9. The structure according to claim 8, wherein said insulated plate is further provided with a fifth contact, and the other of said first plates being provided with an additional contact for engaging said last insulated plate contact.

References Cited in the file of this patent

UNITED STATES PATENTS

| | | |
|---|---|---|
| 2,245,793 | Kurlander | June 17, 1941 |
| 2,514,604 | Hollins | July 11, 1950 |
| 2,531,377 | Lawson | Nov. 21, 1950 |
| 2,667,603 | Hollins | Jan. 26, 1954 |
| 2,672,531 | Stevenson | Mar. 16, 1954 |
| 2,710,317 | Pearl | June 7, 1955 |
| 2,730,630 | Bruno | Jan. 10, 1956 |